Jan. 9, 1962 P. R. WEINANDY 3,015,857
METHOD FOR FORMING CORRUGATED TUBING
Filed Sept. 4, 1959 2 Sheets-Sheet 1
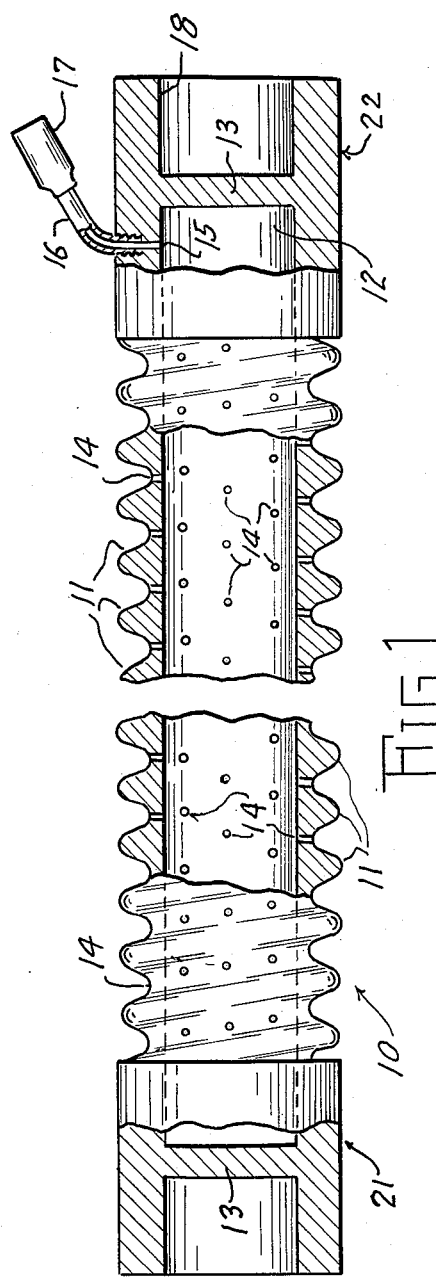
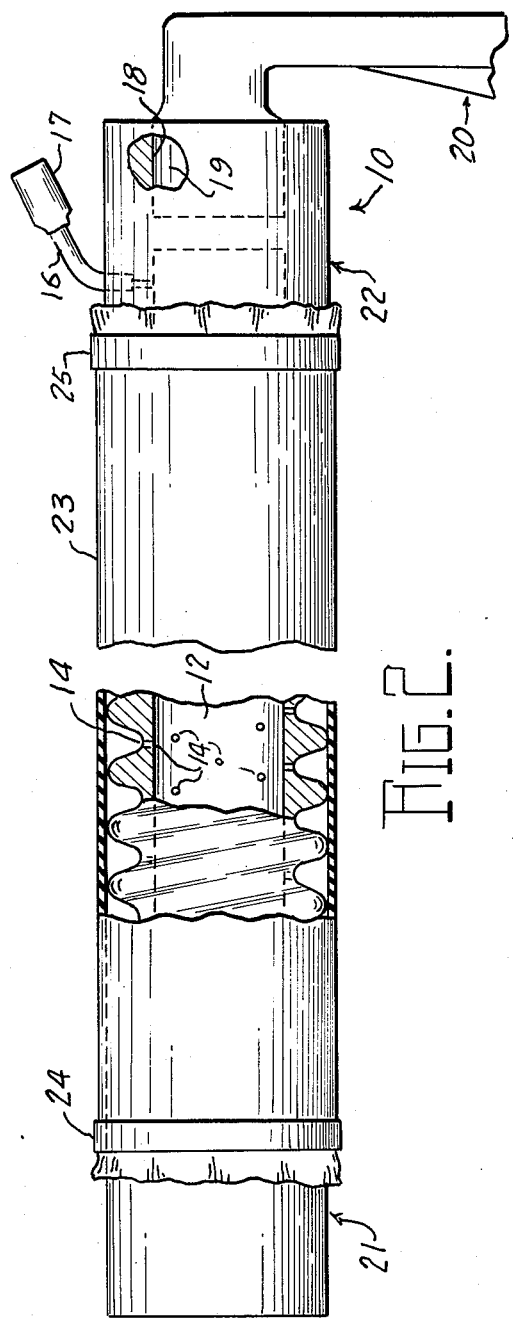
INVENTOR.
PAUL RICHARD WEINANDY
BY
Owen & Owen
ATTORNEYS Jan. 9, 1962 P. R. WEINANDY 3,015,857
METHOD FOR FORMING CORRUGATED TUBING
Filed Sept. 4, 1959 2 Sheets-Sheet 2
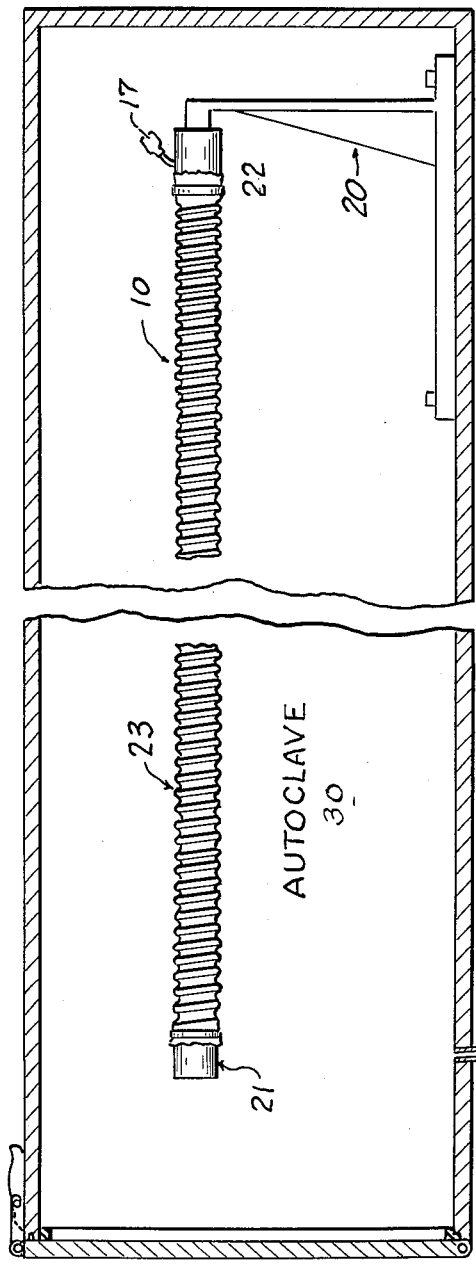
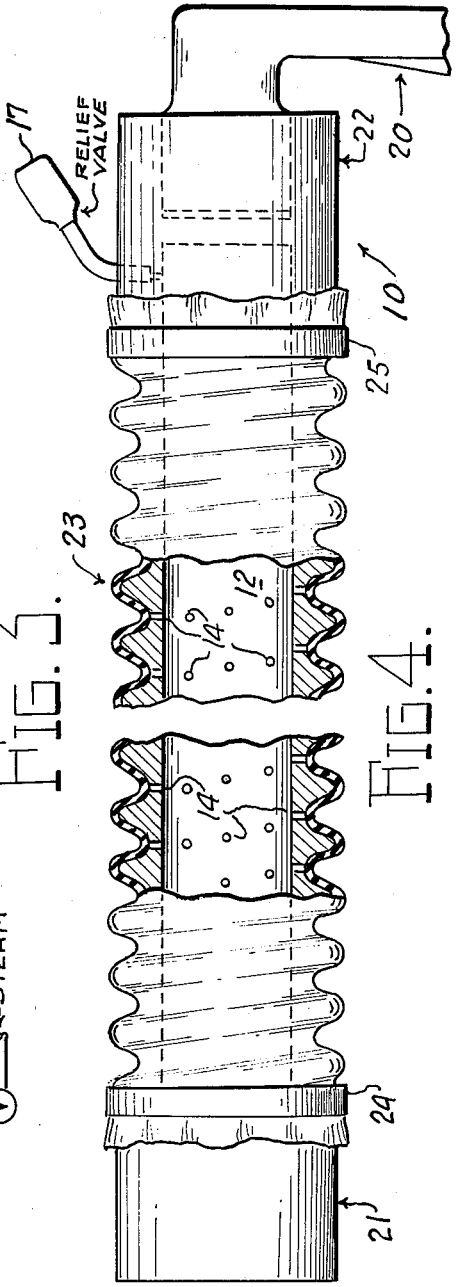
INVENTOR.
PAUL RICHARD WEINANDY
BY Owen + Owen
ATTORNEYS United States Patent Office 3,015,857
Patented Jan. 9, 1962

3,015,857
METHOD FOR FORMING CORRUGATED TUBING
Paul Richard Weinandy, Findlay, Ohio, assignor to Cooper Tire & Rubber Company, Findlay, Ohio, a corporation of Delaware
Filed Sept. 4, 1959, Ser. No. 838,312
1 Claim. (Cl. 18—56)

This invention relates to an improved method for forming corrugated tubing of rubber or the like, such tubing having numerous uses, as, for example, flexible exhaust hose.

Corrugated tubing for use as exhaust hoses, vacuum cleaner hoses and the like, has previously been formed by drawing a length of uncured rubber tubing over a corrugated core, wrapping the exterior of the uncured tubing of rubber or the like with a cord or wire to squeeze it inwardly into the valleys between the corrugations on the core and then curing the rubber in this form. After curing, it is necessary to upwrap the exterior cord before the tubing can be removed from the core.

It is the principal object of the instant invention to provide a method for forming corrugated tubing over a corrugated core or mandrel without the necessity for using the externally wrapped forming cord.

The instant invention provides a method of manufacture comprising the following steps:

(1) Placing a length of uncured tubing, composed of rubber or the like, circumjacent a corrugated hollow core at room temperature;

(2) Creating a pressure differential between the exterior and interior of the tubing, with the higher pressure exterior thereof, in order to squeeze the tubing into the corrugations;

(3) Heating the tubing to curing temperature for a period of time sufficient to properly cure the material; and (4) Lowering the pressure exteriorly of the tubing to atmospheric pressure and simultaneously venting the interior of the tubing to atmosphere and lowering the temperature of the tubing to room temperature.

Further objects and advantages of the invention will be better understood from the specification which follows and from the drawings, in which:

FIGURE 1 is a fragmentary view, partly in elevation and partly in section, showing a mandrel which may be used in forming the corrugated tubing according to the invention;

FIGURE 2 is a view similar to FIG. 1 and showing also a section of uncured tubing mounted circumjacently in the mandrel, and an end support for same;

FIGURE 3 is a section through an autoclave unit showing the mandrel and tubing supported therein; and FIGURE 4 is a view similar to FIG. 2, but showing the tubing material in its final shape contacting the corrugations of the mandrel and just prior to removal therefrom.

In order to carry out the method of the instant invention, some form of central forming core must be employed over which to shape the tubing in order to give it corrugations. In the method as illustrated in the drawings, a corrugated, hollow mandrel, generally indicated at 10, is shown as suitable for this use. Corrugations 11 of the proper shape and size to form the finally desired corrugated tubing are cast or machined on the exterior surface of the mandrel 10. The corrugations 11 may be formed by a single helical ridge, as shown in the drawings, or they may be a plurality of annular ribs, the precise shape being dictated by convenience of manufacturing the mandrel 10. The mandrel 10 is tubular with its interior forming a chamber 12 which extends substantially the entire length of the mandrel 10, the ends of the chamber 12 being formed by walls 13 which are set in from the ends of the mandrel 10. Vent holes 14 are drilled, or otherwise formed, through the wall of the mandrel 10, leading from the valleys between the corrugations 11, into the interior of the chamber 12. One end of the chamber 12 is drilled and tapped to form a passageway 15, to receive a threaded connection 16 of a relief valve 17. Because the walls 13 are set in from the ends of the mandrel 10, sockets 18 are formed at each end of the mandrel 10 to receive a horizontal mounting stud 19 which is supported on a suitable floor post 20.

At each end of the mandrel 10, beyond the corrugations 11, its exterior is formed to provide short cylindrical portions indicated generally at 21 and 22. The portions 21 and 22 may have outer diameters the same as the maximum outer diameter of the corrugations 11, or the diameter of the portion 21, for example, may be less than that of the portion 22 in order to provide for telescoping connecting between two or more lengths of tubing.

As shown in FIGURE 2, the mandrel 10 is supported on its post 20 with one end free and a length of uncured tubing 23 or rubber or the like is slid over the exterior of the corrugations 11 and anchored by means of suitable bands 24 and 25 to the respective ends 21 and 22 of the mandrel 10. After the bands 24 and 25 are tightened to render the interior of the tubing 23 air tight, the assembled unit is placed in the interior of an autoclave 30 and the next step of the method carried out. In FIG. 3, the assembly is drawn as if tube forming operation had taken place.

*Operation*

In the practice of the method of corrugated tube formation, according to the invention, the tubing 23 is slid over the mandrel 10, from the free end 21 thereof, and securely clamped around the cylindrical parts 21 and 22 of the mandrel 10 by the clamps 24 and 25. The entire assembly as shown in FIGURE 2 is now placed in a suitable steam autoclave unit 30, and the steam pressure built up to say 60 p.s.i.g. or about 310° F. Because the air pressure within the chamber 12 is only atmospheric, the greater pressure exteriorly of the tubing 23 forces the rubber or similar material into the valleys between corrugations 11, displacing air from the valleys between the exterior of the mandrel 10 and the interior of the tubing 23 inwardly into the chamber 12 through the perforations 14 in the walls of the mandrel 10. The pressure in the autoclave 30 is held for a period of time sufficient to cure the particular material of which the tubing 23 is fabricated.

At the end of the curing period the pressure in the autoclave 30 is relieved. Because the pressure of the air in the chamber 12 within the mandrel 10 is greater than atmospheric, because of the air forced thereinto and because it has been heated, when the autoclave pressure drops to atmospheric the chamber 12 must be vented also. The relief valve 17 allows the pressure in the chamber to equalize with the atmosphere. As the mandrel 10 cools, the pressure interiorly of the chamber 12 may even drop below atmospheric. In such case, the differential pressure between atmosphere outside and lower pressure inside continues to hold the tubing 23 in the corrugations as it finally cools to fixed form.

When the cooling of the tubing 23 is complete, the tube is stripped off of the mandrel 10, and the rough ends where the clamps 24 and 25 were attached are cut off to provide a finished length of flexible corrugated tubing.

A corrugated exhaust tubing, 10 feet in length and nominal 2 inches in inside diameter, is formed with a wall having a thickness of 3/32 inch from a tubing fabricated from a blend of synthetic rubbers. The mandrel has corrugations 17/64 inch from crest to valley and about two turns to the inch. The uncured tubing has an inside diameter of 2 3/16 inches and a wall thickness of 9/64 inch. According to the invention, the uncured length of tubing is secured circumjacently the mandrel and cured in an autoclave at 60 p.s.i.g. for a period of about 40 minutes. At the termination of this curing time, the autoclave is vented and, as described above, by the venting of the interior of the mandrel the tubing is held in its corrugated form until it cools to room temperature after which it is slid off the end of the forming mandrel.

I claim:

In a method for shaping corrugated tubing wherein a length of tubing is placed circumjacent a hollow corrugated core having holes extending between the exterior surface of the core and a chamber therein while the tubing is at room temperature and atmospheric pressure; the steps of sealing the ends of the tubing on the core to entrap air therein, increasing the pressure on the exterior of the tubing to force the tubing between the corrugations thereby forcing the air entrapped therein through the holes and compressing the same in the chamber to a pressure above atmospheric pressure but below the pressure applied to the exterior of the tubing to prevent the tubing from entering the holes, heating the tubing to curing temperature while maintaining the pressure on the exterior of the tubing, lowering the pressure exteriorly of the tubing to atmospheric pressure, venting the chamber interior to the atmosphere when the pressure of the entrapped air becomes greater than the pressure on the exterior of the tubing, and lowering the temperature of the tubing to room temperature.

References Cited in the file of this patent

UNITED STATES PATENTS 2,272,704    Harding _____ Feb. 10, 1942

FOREIGN PATENTS 651,097    Great Britain _____ Mar. 11, 1951